(12) United States Patent
Schmidt

(10) Patent No.: US 8,792,901 B2
(45) Date of Patent: Jul. 29, 2014

(54) SYSTEM AND METHOD FOR ASSESSING RADIO SENSING DATA

(75) Inventor: Jeffrey C. Schmidt, Orlando, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 171 days.

(21) Appl. No.: 13/597,053

(22) Filed: Aug. 28, 2012

(65) Prior Publication Data

US 2014/0065975 A1    Mar. 6, 2014

(51) Int. Cl.
*H04W 72/00* (2009.01)
*H04W 16/14* (2009.01)
*H04B 17/00* (2006.01)

(52) U.S. Cl.
CPC .................................... *H04W 16/14* (2013.01)
USPC ........................................ 455/454; 455/67.11

(58) Field of Classification Search
CPC ............................................... H04W 16/14
USPC .................................. 455/63.1, 67.11, 454
See application file for complete search history.

(56) References Cited

U.S. PATENT DOCUMENTS

| | | | |
|---|---|---|---|
| 2003/0109274 A1* | 6/2003 | Budka et al. | 455/522 |
| 2004/0203392 A1 | 10/2004 | Hsu et al. | |
| 2008/0221951 A1 | 9/2008 | Stanforth et al. | |
| 2008/0222019 A1 | 9/2008 | Stanforth et al. | |
| 2008/0222021 A1 | 9/2008 | Stanforth et al. | |
| 2009/0046625 A1 | 2/2009 | Diener et al. | |
| 2009/0197627 A1 | 8/2009 | Kuffner et al. | |
| 2010/0003993 A1 | 1/2010 | Engstrom | |
| 2010/0240407 A1 | 9/2010 | Park et al. | |
| 2011/0163917 A1 | 7/2011 | Lundgren et al. | |
| 2012/0165059 A1 | 6/2012 | Schmidt et al. | |
| 2013/0237278 A1* | 9/2013 | Oka et al. | 455/524 |

FOREIGN PATENT DOCUMENTS

WO    2011131763 A1    10/2011

OTHER PUBLICATIONS

"Digital Dividend: Cognitive Access, Consultation on License-Exempting Cognitive Devices using Interleaved Spectrum", Ofcom, Publication Date: Feb. 16, 2009.
By the Commission, "Second Report and Order, Order on Reconsideration, and Second Further Notice of Proposed Rulemaking", Federal Communications Commission, 2004, FCC 04-167, WT Docket No. 00-230, pp. 1-180.
FCC 08-260, Second Report and Order and Memorandum Opinion and Order, Adopted Nov. 4, 2008 and Released Nov. 14, 2008.
Kwerel, Evan et al., "A Proposal for a Rapid Transition to Market Allocation of Spectrum", Federal Communications Commission, 2002, OPP Working Paper No. 38, pp. 1-50.
Radio Spectrum Management, Module 5 of ICT Regulation Toolkit, ITU, 2007.
Prabhu, Krish et al., "Time for Action" Genuine Ideas, 2002, [retrieved online Feb. 1, 2008], <http://www.genuineideas.com/ArticlesIndex/TimeForAction.htm>.
U.S. Spectrum Management Policy: Agenda for the Future, 1991.
47 C.F.R. 15.713, Dec. 2010.
Jones, Steven K. et al., "Initial Evaluation of the Performance of Prototype TV-Band White Space Devices", (2007), OET Report, FCC/OET 07-TR-1006.
International Search Report and Written Opinion from corresponding International Application No. PCT/US2013/55092, mailed on Jan. 22, 2014.

* cited by examiner

*Primary Examiner* — Lee Nguyen

(74) *Attorney, Agent, or Firm* — Renner, Otto, Boisselle & Sklar, LLP

(57) ABSTRACT

A system for generating spectrum environment data receives spectrum sensing data from a wireless electronic device. The sensing data includes, for each of plural channels, a sensing measurement value expressed with a sensing resolution bandwidth and indicative of perceived signal strength. The system normalizes the received sensing measurement values so that each value has a predetermined analysis resolution bandwidth. The system also calibrates the normalized sensing measurement values to adjust for differences between perceived signal strength and predicted signal strength for at least one reference channel on which a protected transmitter with known operational characteristics transmits.

34 Claims, 4 Drawing Sheets

| Transmitter no. | TV channel no. | Channel frequency (MHz) | Channel wavelength (m) | Azimuth (degrees) | Relative antenna gain adjustment value (db) | Predicted field strength (dbuV/m) | Sensing sample value (dbm/ 100 kHz) | Normalized sensing sample (dbm/6 MHz) | Predicted receive power (dbm/6 MHz) | Calibration Offset |
|---|---|---|---|---|---|---|---|---|---|---|
| 1 | 21 | 515 | 0.582524272 | 0 | 0 | 90 | -65 | -47.2 | -40.9 | 6.3 |
| 2 | 22 | 521 | 0.575815739 | 38 | 0 | 120 | -30 | -12.2 | -11.0 | 1.2 |
| 3 | 23 | 527 | 0.569259962 | 156 | 0 | 100 | -54 | -36.2 | -31.1 | 5.1 |
| 4 | 25 | 539 | 0.556586271 | 92 | 0 | 110 | -44 | -26.2 | -21.3 | 4.9 |
| 5 | 26 | 545 | 0.550458713 | 255 | 0 | 80 | -77 | -59.2 | -51.4 | 7.8 |
| 6 | 27 | 551 | 0.544464610 | 300 | 0 | 130 | -22 | -4.2 | -1.5 | 2.7 |

FIG. 4

SYSTEM AND METHOD FOR ASSESSING RADIO SENSING DATA

TECHNICAL FIELD OF THE INVENTION

The technology of the present disclosure relates generally to telecommunications and, more particularly, to a system and method for assessing sensing data generated by one or more deployed radio devices.

BACKGROUND

Sensing radio frequency (RF) energy or signals is a technique that is often employed by electronics devices to ascertain the quality of an electromagnetic environment. The electronic device may identify the channels on which the electronic device detects (or "sees") transmission activity of other devices and corresponding signal strengths. This technique is also called RF sensing or spectrum sensing. Spectrum sensing is often used by electronic devices to detect undesired signals or interference within a specific frequency range to qualify potential interference and mitigate its effects (e.g., by selecting a channel with minimal interference).

In one exemplary situation, in channels where high power devices such as TV transmitters and low power devices such as television band radio devices (TVBDs) co-exist to share the spectrum, the TVBDs perform sensing of the environment to determine signal strengths on various channels. However, such sensing presents challenges in terms of attempting to accurately portray the spectrum environment.

Also, the ability of the electronic device to share sensing data with other devices or networks is limited. For example, sensing data generated by one device often is not useful to other devices due to difference between the devices, such as differences in how sensing measurements are made (e.g., differences in sensing bandwidth resolution), antenna pattern, antenna gain, adjacent channel blocking performance, etc. Also, local obstructions may affect one device, but not another device. As such, spectrum sensing measurements are relative and the sensing data generated by one device tends to only be useful for the device making the measurement.

SUMMARY

In view of the foregoing, there is a need in the art for improved ways of standardizing and sharing RF sensing data. Some aspects of this disclosure describe calibration and assessment of data relating to detected signal strengths to provide useful information for deployed radio devices and networks. The disclosed techniques provide for an absolute comparison of sensing data sets that are generated by more than one electronic device to collectively evaluate a spectrum environment. The calibrated spectrum environment information from one or more devices may be useful in determining which channels from an available list of channels have too much noise to service the wireless communication needs of a radio device.

BRIEF DESCRIPTION OF THE DRAWINGS

FIG. 4 is a table showing representative data for a prophetic example of the logical operations carried out by the server.

DETAILED DESCRIPTION OF EMBODIMENTS

Figure 1:
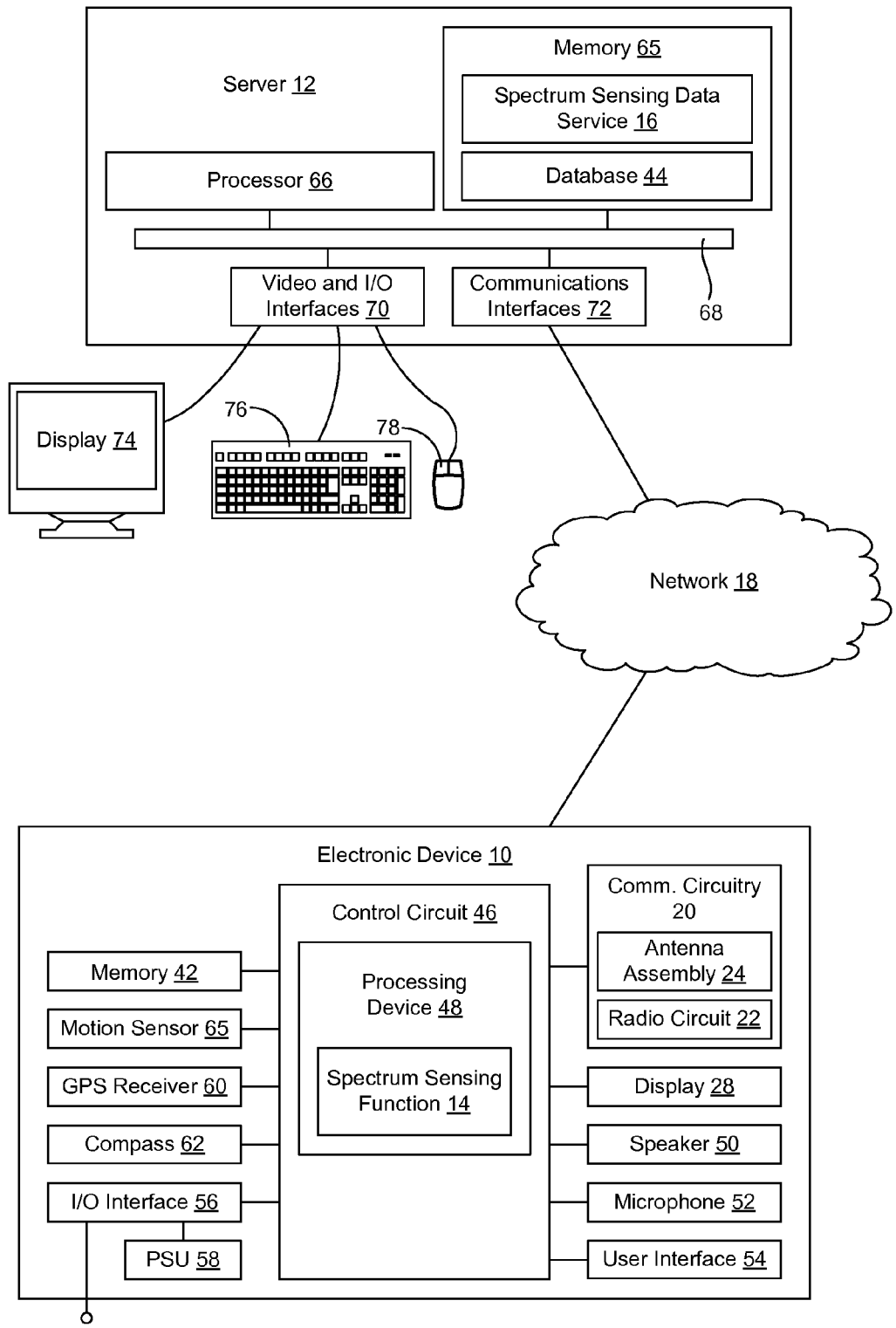
FIG. 1 is a schematic view of an exemplary system for generating, assessing and sharing radio sensing data.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. Introduction

Methods and systems for generating, assessing and sharing radio sensing data for electronic devices will be described.

In one embodiment, the electronic device is a spectrum sniffer that performs spectrum sensing (also referred to as RF sensing) to ascertain the quality of the radio frequency environment. In the described and illustrated embodiments, however, the electronic device includes a radio for engaging in wireless communications with other electronic devices and performs spectrum sensing. Resulting sensing data may be of assistance in one or more of planning spectrum use for the electronic device and other electronic devices, in determining the sensing performance of the electronic device across the sensed bands, or in identifying the presence of obstructions near the electronic device.

To enhance the availability and reliability of wireless communications, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees.

As another approach to making spectrum available to many users, some spectrum may be used without a license in a regulated spectrum sharing environment. For example, the FCC has eliminated analog television (TV) broadcasts. This has freed spectrum channels for use by unlicensed radio systems to offer various services, such as mobile communications and Internet access. In this context, the freed spectrum is commonly referred to as TV white space but other types of white spaces are possible. In the case of TV white space, the white space is comprised of unused TV spectrum between channel 2 and channel 51 (corresponding to 54 MHz to 698 MHz).

Although various regulatory agencies have identified parameters for the use of unlicensed and/or shared spectrum, such as TV white spaces, there is room for improvement in the manner in which radio devices are informed of available spectrum and possible interference.

In one embodiment, spectrum sensing samples are taken by one or more electronic devices and the samples are communicated to a server that hosts a spectrum assessment service. The spectrum sensing samples are normalized, calibrated, and assessed to make the data useful for spectrum-use planning by the electronic devices that respectively made the spectrum measurements or by other devices.

In situations where multiple channels are available for wireless communications, it is possible that some channels are better choices than others due to the relative amounts of noise on each channel. For instance, some unlicensed WiFi channels at 2.4 GHz may be occupied by existing WiFi networks and others may be unoccupied. As another example, television channels may be unoccupied by protected devices and, therefore, available for wireless communications. But not all of these available channels will have equal amounts of noise. Channels with a relatively high amount of noise, referred to as "grey spaces," may not adequately support the wireless communications operations of some radio devices.

The measurement of signal strength, interference or induced noise floor present in each channel may depend on characteristics of the device making the measurement. For example, location, antenna configuration, orientation, and operational performance of the electronic device all may affect interference or noise floor measurements. To improve the usefulness of spectrum sensing data, a server may receive spectrum sensing data from an electronic device. The received data is normalized and calibrated. This allows for accurate assessment of the sensing data and to perform absolute comparisons of sensing data generated by multiple electronic devices, even if the electronic devices have different locations, antenna configurations, orientations, or operational performance, or conduct spectrum sensing in different manners (e.g., with different bandwidth resolutions). Normalization of spectrum sensing data eliminates variations in the bandwidth resolution used by different electronic devices while making sensing measurements. Calibration reduces variation in measurement results due to antenna configuration, orientation, and operational performance of each electronic device.

For purposes of description, the electronic device will be described in the context where the electronic device is a TVBD. It will be appreciated, however, that the electronic device may be another type of device, such as a mobile telephone, a computer (e.g., a laptop computer or a tablet computer), a mobile WiFi hotspot device, a media player, a gaming device, a personal digital assistant (PDA), an electronic book reader, a spectrum sniffer, a WiFi router, a wireless access point, etc. The electronic device may have a fixed location, such as a wireless access point, or may be portable, such as one of the above-mentioned devices. It will be understood that each described electronic device may be an electronic system that includes one or more than one device that is capable of performing radio sensing or wireless communications. As an example, the electronic device may be a radio system, such as a network that offers connectivity services to client devices.

In the context of white spaces, the white spaces may be television white spaces or some other form of useable spectrum that is interleaved with spectrum used by incumbent, licensed or existing users, even if that spectrum is not referred to as white space by a governing regulatory entity. It will be appreciated, however, that the techniques described in this document may apply to other situations, including situations that do not involve the selection of an operational channel.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

In embodiments in this disclosure, the electronic device senses electromagnetic spectrum and transmits corresponding sensing data to a server. The server normalizes, calibrates and assesses the sensing data. The server also may undertake other spectrum management functions, such as responding to white space channel list requests with appropriate channel lists. Therefore, in some embodiments, the server may be considered a central white space registration system.

B. System Architecture

Figure 2:
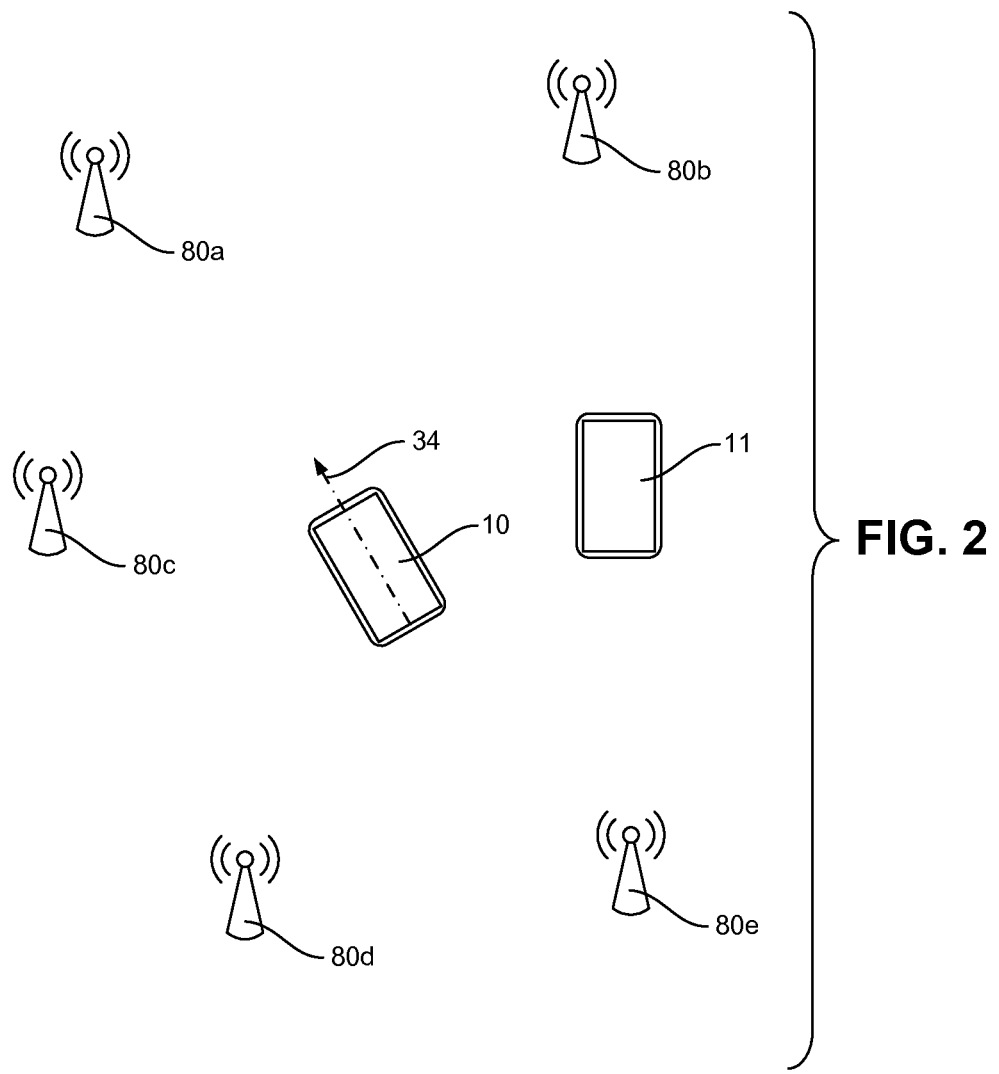
FIG. 2 is a representative operational environment for an electronic device that makes spectrum sensing measurements.

Referring initially to FIG. 1, shown is a system that includes an electronic device 10 and a server 12. The electronic device 10 typically, but not necessarily, has Internet communication capabilities via wireless and/or wired connection. The electronic device 10 may be any type of electronic device, as indicated above. The server 12 communicates with the electronic device 10, as well as with plurality of other devices, such as electronic device 11 (FIG. 2). The server 12, in addition to providing spectrum sensing support services, may be a central white space registration system or some other form of spectrum management platform. The server 12 provides its services to the electronic device 10 and to other electronic devices, such as electronic device 11. The electronic device 10 and other electronic device 11 may communicate with the server 12 through a network 18, such as the Internet.

The electronic device 10 is capable of sensing the signal strength of radio frequency signals on various frequencies to which the electronic device 10 is capable of tuning. The measurements are commonly, but not necessarily made in terms of decibels per hertz. The electronic device 11 is capable of sensing the strength of radio frequency signals in a similar manner. The electronic device 10 and the electronic device 11 respectively have known antenna patterns. The electronic device 10 and the electronic device 11 are location aware (e.g., capable of determining their respective geo-locations using GPS or other location-determining technology).

The electronic device 10 may include a spectrum sensing function 14 and the server 12 may include a spectrum sensing data service 16. The spectrum sensing function 14 and spectrum sensing data service 16 may cooperate with each other to assess channel quality.

The electronic device 10 includes communications circuitry 20. In the illustrated exemplary embodiment, as part of the communications circuitry 20, the electronic device 10 includes a radio circuit 22 and an antenna assembly 24. The communications circuitry 20 may be used to carry out various wireless communications functions, including communicating with the server 12. In the exemplary case where the electronic device 10 is a mobile telephone, the communications functions may include engaging in voice or video calls, and sending or receiving messages (e.g., email messages, text messages, multimedia messages, instant messages, etc.), accessing the Internet, etc.

The illustrated components of the communications circuitry 20 may represent one or more than one radio transceiver to enable the electronic device 10 to be able to communicate over various types of network connections and/or protocols. For instance, the electronic device 10 may be configured to communication with a cellular communications network. Exemplary cellular communications network types include, by are not limited to, networks operating in accordance with global system for mobile communications (GSM), enhanced data rates for GSM evolution (EDGE), code division multiple access (CDMA), wideband CDMA (WCDMA), integrated services digital broadcasting (ISDB), high speed packet access (HSPA), or any other appropriate standard or advanced versions of these standards. The cellular communications networks may be compatible with 3G and/or 4G protocols. Additionally, or as an alternative to cellular communications capability, the electronic device 10 also may be configured to communicate with other types of networks, such as a packet-switched network. An exemplary packet-switched network includes a network configured in accordance with IEEE 802.11 (e.g., IEEE 802.11a, IEEE 802.11b, or IEEE 802.11n), each of which are commonly referred to as WiFi. Another exemplary packet-switched network includes a network configured in accordance with IEEE 802.16 (commonly referred to as WiMAX).

The gain pattern of the antenna assembly 24 may be known. The gain is specified with respect to the antenna structure 24, which is typically fixed relative to a housing of the electronic device 10. In the illustrated embodiment, the gain pattern is indexed with respect to the longitudinal axis (denoted by arrow 34 in FIG. 2) of the electronic device 10. Regardless of the relationship of the antenna assembly 24 and the electronic device 10, the antenna pattern will be considered fixed with respect to the device. An exemplary gain pattern for the antenna assembly 24 is an omni-directional ("omni") pattern, but other patterns are possible. In other embodiments, the gain (or directivity of the antenna) is variable. For example, the antenna assembly 24 may be controlled to have a gain selected from two or more predetermined profiles. In still another embodiment, the antenna assembly 24 may be controlled to customize the gain.

Overall functionality of the electronic device 10 may be controlled by a control circuit 46 that includes a processing device 48. The processing device may execute code stored in a memory within the control circuit 46 and/or in a separate (e.g., the memory 42) in order to carry out the operations of the electronic device 10. For instance, the processing device 48 may be used to execute the spectrum sensing function 14. The memory 42 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 42 includes a non-volatile memory for long term data storage and a volatile memory that functions as system memory for the control circuit. The memory 42 may exchange data with the control circuit 46 over a data bus. Accompanying control lines and an address bus between the memory 42 and the control circuit 46 also may be present.

The electronic device 10 may include a display 28 for displaying visual information to a user. Also, the electronic device 10 may include a speaker 50 and a microphone 52 to allow the user to carry out voice conversations. One or more user interfaces 54, such as a keypad and/or a touch-sensitive input associated with the display 28, may be present to provide for a variety of user input operations.

The electronic device 10 may further include one or more input/output (I/O) interface(s) (not shown). The I/O interface(s) may include one or more electrical connectors for connecting the electronic device 10 to another device (e.g., a computer) or an accessory (e.g., a personal handsfree (PHF) device) via a cable, and/or for connecting the electronic device 10 to a power supply. Therefore, operating power may be received over the I/O interface(s) and power to charge a battery of a power supply unit (PSU) of the electronic device 10 may be received over the I/O interface(s). The PSU may supply power to operate the electronic device 10 in the absence of an external power source.

A position data receiver, such as a global positioning system (GPS) receiver 60, may be involved in determining the location of the electronic device. A compass 62 may be used to determine the orientation of the electronic device 10 and, more specifically, the direction (e.g., azimuth) of the bore sight of the antenna assembly 24. It will be appreciated that the azimuth of the antenna assembly 24 will change with changes in orientation of the electronic device 10. In one embodiment, the electronic device 10 is configured to determine the compass direction of the antenna assembly 24 and include this information in sensing data transmitted by the electronic device 10 to the server 12.

One or more motion sensors (not shown), such as accelerometers, may be used to sense movement of the electronic device 10. The motion sensors may be used to determine compass direction of the electronic device 10 or inclination of the antenna assembly 24 (e.g., angle of the antenna assembly 24 with respect to horizontal or vertical inclination).

The server 12 may be implemented as a computer-based system that is capable of executing computer applications (e.g., software programs), including the spectrum sensing data service 16 to transmit information about the spectrum environment to the electronic devices 10, 11 that is based on spectrum sensing information collected by the server 12. The spectrum sensing data service 16 and a database 44 may be stored on a non-transitory computer readable medium, such as a memory 65. The database 44 may be used to store various information sets used to carry out the functions described in this disclosure. The memory 65 may be a magnetic, optical or electronic storage device (e.g., hard disk, optical disk, flash memory, etc.), and may comprise several devices, including volatile and non-volatile memory components. Accordingly, the memory 65 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices.

In addition to storing sensing data received from the electronic device 10, the server 12 may store or access data about known high power transmitters (e.g., television stations, FM radio stations, or other transmitter devices or beacons with known and stable transmission characteristics). The server 12 also may carry out functions to determine predicted field strength of emissions from high power transmitters at the locations of the electronic devices 10, 11.

To execute logical operations, the server 12 may include one or more processors 66 used to execute instructions that carry out logic routines. The processor 66 and the memory 65 may be coupled using a local interface 68. The local interface 68 may be, for example, a data bus with accompanying control bus, a network, or other subsystem.

The server 12 may have various input/output (I/O) interfaces 70 as well as one or more communications interfaces 72. The interfaces 70 may be used to operatively couple the server 12 to various peripherals, such as a display 74, a keyboard 76, a mouse 78, etc. The communications interface 72 may include for example, a modem and/or a network interface card. The communications interface 72 may enable the server 12 to send and receive data signals, voice signals, video signals, and the like to and from other computing devices via an external network. In particular, the communications interface 72 may connect the server 12 to the network 18.

In one embodiment, the server 12 may be configured to host the below-described services for a plurality of electronic devices, including the electronic devices 10, 11. In some embodiments, the services may include transmission of assessed spectrum sensing data. The services may also include spectrum management functions, such as providing channel lists to qualified radio devices upon registration so as to allow the radio devices to make use of spectrum for wireless communications. Also, while the providing of services may be fully automated, the server 12 may host an Internet-style website for the various corresponding parties to conduct initial enrollment with the server 12, conduct manual registration if needed, access various tools and reports supplied by the server 12, and so forth. For supplying the services, the server 12 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

C. Collection of Sensing Data

Available, interference-free spectrum for supporting wireless communications is a scarce resource and the demand for wireless communications is increasing. The following techniques assist in using spectrum efficiently by assessing spectrum sensing data from one or more electronic devices and providing results of the assessment to at least one electronic device.

With additional reference to FIG. 2, the techniques will be described in an exemplary environment where at least one low-powered electronic device (e.g., electronic devices 10 and 11) and high-powered protected transmitters 80 share a common set of bands. In the illustrated exemplary embodiment, the electronic devices 10, 11 are low-power, broadband data transceivers (e.g., TVBDs) that operate at about +30 dbm in white spaces that are interleaved with channels used by television transmitters (the devices 80) that can operate up to +90 dbm. The high-powered transmitters 80 operate in respective protected areas. The protected areas are established to reduce interference to the receipt of signals from the transmitters 80 by limiting the use of the channel on which the transmitter 80 operates (referred to as the primary channel of the transmitter 80) by other devices in the protected area. In the illustrated example, there are five high-powered transmitters 80 (identified as 80a through 80e), but there may be more than or fewer than five transmitters 80 that have an effect on signal strengths on various channels at the respective locations of the electronic devices 10, 11. It will be appreciated that the schematic illustration of the locations of the radio devices 10, 11 and 80 in FIG. 2 is not to scale, but is used to represent the relative positioning of the radio devices. For purposes of description, however, the electronic devices 10 and 11 are assumed to be within the protected area of each of the transmitters 80.

The availability of certain frequencies, such as white space channels, is a function of time, channel use, and geographic area. This concept of a shared spectrum ecosystem presents little risk to the operational capability of low power receivers demodulating signals from the high-power transmitters 80 as the low-power devices 10, 11 tend to not cause interference to reception of the high-power signals as they do not engage in co-channel operations within protected areas. But the presence of high-powered transmitters can be very disruptive to operation of the low-power devices 10, 11. By comparison, the high-power transmitters often broadcast at hundreds of kilowatts or higher (e.g., about one megawatt) and with high-elevation antennas, whereas the low-power devices typically rely on transmitters of about one watt or less and are deployed with lower elevation antennas.

The high-power transmitters operating in VHF and UHF frequencies have a vast reach that affects the induced noise floor over very large areas (e.g., hundreds of miles). Also, out-of-band emissions by high-power transmitters can have large contributions to induced noise floor on channels adjacent each high-power transmitter's primary channel. To evaluate noise or interference conditions, the electronic device 10 performs spectrum sensing at various frequencies. Sensing the strength of the radio frequency signal on various channels enables the electronic device 10 to detect potentially undesired signals or interference that exists within each respective frequency range. The sensing of radio frequency signal strengths may be performed at various frequencies and at various points in time by each of plural devices (e.g., each of the electronic devices 10, 11). Data samples representing the sensed signal strengths may be transmitted to the server 12. The samples may be transmitted to the server 12 as they are generated for each sampled frequency or they may be transmitted cumulatively after sensing over a range of frequencies and/or over time. The data samples are transmitted in any appropriate message or packetized data format over the network 18. The data samples received by the server 12 may be stored by the server 12.

D. Assessment of Sensing Data

Figure 3:
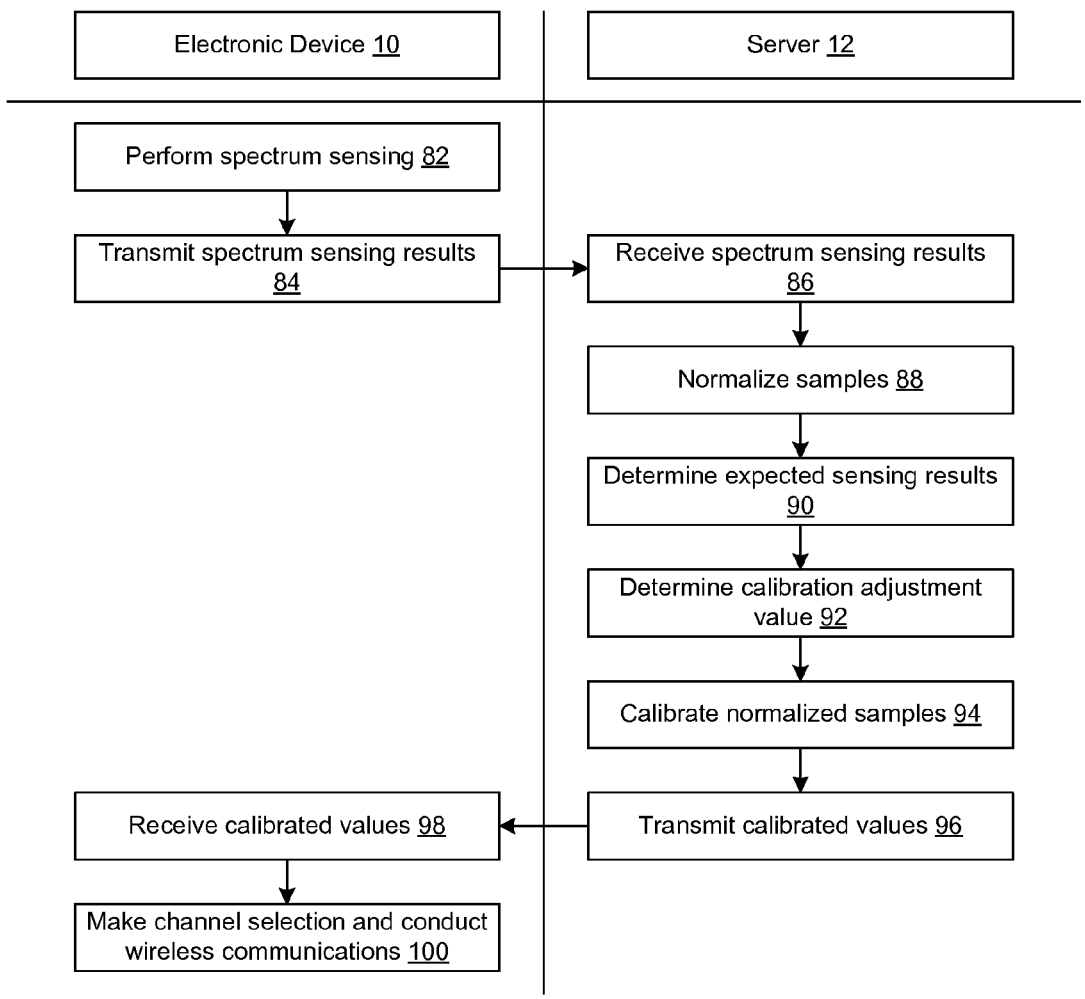
FIG. 3 is a flow diagram representing logical operations carried out by an electronic device and a server to assess and share spectrum sensing data.

With additional reference to FIG. 3, illustrated are logical operations carried out by the electronic device 10 and carried out by the server 12 to implement respective methods of assessing and sharing sensing data. The exemplary methods may be respectively carried out by cooperatively executing an embodiment of the spectrum sensing function 14 and an embodiment of the spectrum sensing data service 16. Thus, the flow diagram may be thought of as depicting steps of one method carried out by the electronic device 10 and another method carried out by the server 12. Although the flow chart shows a specific order of executing functional logic blocks, the order of executing the blocks may be changed relative to the order shown. Also, two or more blocks shown in succession may be executed concurrently or with partial concurrence. One or more blocks may be omitted.

In block 82, the electronic device 10 performs sensing of radio frequency signals in the electromagnetic spectrum and, in block 84, transmits sensed data samples to the server 12. Different radio devices may sample spectrum in different manners. Typically, the device will make signal strength measurements (e.g., determine received signal strength indication or RSSI) for each channel in a range of channels. In the exemplary context of a TVBD, the range of channels may include VHF or UHF channels.

The results of the spectrum sensing are transmitted from the electronic device 10 to the server 12 in block 84. The results are in the form of a spectrum sensing data set that includes a plurality of samples taken over the sampled range of frequencies. Each measurement taken by the electronic device 10 is taken with a measurement bandwidth, typically measured in kilohertz (KHz) or megahertz (MHz). Therefore, the transmitted samples may be expressed in a set of units that is indicative of energy per unit bandwidth, such as watts per hertz (W/Hz) or power ratio in decibels per kilohertz (dbm/KHz). Other information transmitted with the spectrum sensing data set includes the location of the electronic device. In some embodiments, additional information may be transmitted, especially when the antenna 24 is not an omni-directional antenna. The additional information may include, but is not limited to, one or more of the orientation of the electronic device (e.g., compass direction), the antenna configuration, and the antenna height of the electronic device 10 if known.

In block 86, the data set containing the spectrum sensing samples transmitted by the electronic device 10 is received by the server 12. In block 88, the server 12 normalizes the samples. To normalize the samples, the samples are converted from a sensing bandwidth resolution used by the electronic device 10 to an analysis bandwidth resolution used by the server 12. In the case where the sensing bandwidth resolution and the analysis bandwidth resolution are the same, normalization with respect to bandwidth resolution need not be carried out. Also, sensing data may be expressed in units representative of energy, electric field strength, power ratio, etc. Therefore, if appropriate, the data samples are further normalized to express the sensed signal strength in a common manner, such as power ratio (e.g. dbm).

In one embodiment, the server 12 expresses sensed signal strength data values in one common quantification unit (e.g., power ratio per bandwidth resolution) so that spectrum sensing data from various sources may be analyzed in direct and absolute terms, and analysis results may be shared among plural electronic devices in a single unit. Alternatively, when sharing analysis results, the analysis results may be converted to a unit expected by the device receiving the results.

As an example, the electronic device 10 may transmit a sample for each channel expressed in dbm/100 kHz (e.g., a sensing bandwidth resolution of 100 kHz). For TV channels, the bandwidth of each channel is six megahertz. Therefore, it may be desirable to perform analysis in the server in respective six megahertz bandwidths to represent the energy present in the full width of the channel. In this case, the analysis bandwidth resolution could be expressed as dbm/6 MHz. To convert dbm/100 kHz to dbm/6 MHz, 10 log(6/0.1) is added to the data value for each sample. Equation 1 sets forth this representative expression.

Normalized sensing measurement in dbm/6 MHz=Actual sensing measurement in dbm/100 kHz+10 log(6/0.1)  Eq. 1

Next, the server 12 calibrates the normalized sensing data using predicted signal strength values to improve the sensing results. In block 90, the server 12 uses the transmission characteristics of protected transmitters 80 to determine a predicted signal strength value for each of a plurality of reference channels at the location of the electronic device 10. The predicted signal strength for a reference channel is the amount of energy that the electronic device 10 ought to detect on the reference channel.

In one embodiment, the primary channel for each high-power transmitter 80 having a coverage area in which the electronic device 10 is located is a reference channel. In another embodiment, a selected subset of the primary channels for the high-power transmitters 80 having a coverage area in which the electronic device 10 is located and capable of sensing are potential reference channels. In the TV whitespace embodiment, the protected, high-power transmitters 80 corresponding to the reference channels are typically the transmitters of television stations. The transmission characteristics of television stations are well-known and relatively constant. The known characteristics of the transmitter 80 include, but are not limited to, location, antenna height, transmit power, antenna configuration, and so forth. Also known is the terrain between each transmitter 80 and the location of the electronic device 10, as well as the setting in terms of urban environment or rural environment. Using this information, a predicted signal strength value for each of the reference channels at the location of the electronic device 10 may be determined using a path loss model. Exemplary path loss models that may be employed include, but are not limited to, Longley Rice, F-curves, R6602, ITU P.1546 and Raleigh fading. The predicted signal strength values may be determined in terms of electric field strength (e.g., in dbuV/m). Transmitters other than or in addition to television station transmitters may be employed, especially when the electronic device 10 is not a TVBD. For example, FM radio transmitters or any other stable transmitters with known transmission characteristics may be used.

In one embodiment, the predicted signal strength value for each reference channel is adjusted to account for the antenna configuration and orientation of the electronic device 10 to take individual characteristics of the electronic device 10 into consideration when determining predicted receive power that the electronic device 10 ought to detect. The adjustment may be made by adding a relative gain adjustment value. In another embodiment, the predicted signal strength value for each reference channel is determined under the assumption that the electronic device 10 has an omni-directional antenna. This assumption also may be made if the orientation of the electronic device 10 is not known. In some cases, the orientation of an electronic device 10 may be estimated using the device location, antenna configuration and sensed signal strengths as compared to predicted signal strength values to find gross-scale lulls or peaks in detected signal strengths that might correspond to the antenna configuration that can be mapped to azimuths from the electronic device 10 to the reference high-power transmitters 80. In the case where the antenna 24 is assumed to be or actually is an omnidirectional antenna, the relative gain adjustment value is zero.

The predicted electric field strength value is converted to expected receive power (e.g., in dbm per unit bandwidth). The conversion for a six MHz wide channel, for example, may be made in accordance with equation 2 in which the relative gain adjustment value is in dB.

Expected receive power=Predicted electric field strength−115.8+Relative gain adjustment value−Equivalent antenna gain for a 1 square meter aperture  Eq. 2

The equivalent antenna gain for a 1 square meter aperture may be given by equation 3, where λ is the wavelength of the reference channel in meters (m).

$$\text{Equivalent antenna gain for a 1 square meter aperture} = 10\log\left(\frac{4\pi}{\lambda^2}\right) \quad \text{Eq. 3}$$

Next, a calibration adjustment value is determined in block 92. In one embodiment, to determine the calibration adjustment value, a calibration offset is first determined for each reference channel. The calibration offset is the difference between the expected receive power for the reference channel and the value of the normalized sensing power measurement for the reference channel. In one embodiment, calibration adjustment value is the average of the calibration offset values.

Next, in block 94, the normalized sensing power measurements are calibrated. Calibration may be made for all channels for which sensing measurements were made. In another embodiment, calibration may be made for the sensing data for the channels that are not reference channels. In another embodiment, calibration may be made for channels that are available for use for wireless communications by the electronic device 10. In one embodiment, to calibrate one of the normalized sensing power measurements, the normalized sensing power measurement is first converted to a sensed electric field strength value. The conversion may be carried out in accordance with equation 4, for example.

Sensed electric field strength value=Normalized sensing power measurement+115.8+Relative gain adjustment value−Equivalent antenna gain for a 1 square meter aperture     Eq. 4

The calibration adjustment value is then added to the sensed electric field strength value to arrive at a calibrated signal strength value for the channel. This calibrated signal strength value represents electric field strength and may be converted to a power value and/or a different resolution bandwidth, if desired. In this embodiment, the same calibration adjustment value is used for each channel. In another embodiment, the calibration offset value for the reference channel that is closest in frequency to the channel undergoing calibration is used instead of a universal calibration adjustment value. In these embodiments, the adjustment applied to the sensing data is an adjustment value that is indicated of a predictable difference (e.g., in dB) between the measurements taken by the electronic device 10 and the measurement that should have been made.

Once the calibrated signal strength values are determined for each channel, the calibrated signal strength values are transmitted back to the electronic device 10 in block 96. In block 98, the calibrated signal strength values are received by the electronic device 10. In an alternative approach, the calibration adjustment value is transmitted to the electronic device 10 and the electronic device 10 calibrates its sensing measurements using the calibration adjustment value.

In block 100, the electronic device 10 may make use of the calibrated signal strength values. In one embodiment, the electronic device 10 may select an available channel to use for wireless communications. For example, the electronic device 10 may determine which available channel has the lowest calibrated signal strength value and select that channel for use on the premise that the available channel with the lowest calibrated signal strength value will deliver the highest quality of service. It will be appreciated that other channel selection decision criteria may be considered in addition to calibrated signal strength value when making a channel selection. These criteria may include, but are not limited to, cost to use each channel, predetermined channel preference, channel selections of other electronic devices, etc.

The logical flow carried out by the server 12 to normalize and calibrate spectrum sensing data has been described in connection with one set of sensing data received from one electronic device 10. The same logical flow may be undertaken to normalize and calibrate sensing data from other electronic devices, such as the electronic device 11. Also, the same logical flow may be undertaken for each of plural sets of sensing data received from the same electronic device 10, 11.

The operations of block 92 are used to characterize the sensing performance of the electronic device 10. In one embodiment, the value or values used to calibrate sensing data for the electronic device 10 are determined for each sampling data set received from the electronic device 10. In another embodiment, the value or values used to calibrate sensing data for the electronic device 10 are determined for one sampling data set and reused for one or more subsequent sampling data sets, so long as the location and antenna configuration/orientation has not changed.

The sensing data from one device may be shared with another device or the sensing data from multiple devices may be collectively assessed for various purposes, especially when the devices are relatively close in proximity to one another. In one embodiment, devices that are considered relatively close in proximity are devices that have the same transmitters serving to define the reference channels. In another embodiment, devices that are considered relatively close in proximity are devices that are within a predetermined distance of each other, such as 100 meters, 500 meters, or some other distance.

As indicated, there are various uses for the normalized and calibrated sensing data in addition to using the data for making a channel selection. One use is to determine if there are any operational impairment to the electronic device 10. For instance, if the sensing measurements are significantly different than the expected results (e.g., different by more than twenty-five percent), then there is an indication that the electronic device 10 is not performing adequately or is located within a structure that is shielding external signals.

Another use is to determine if an obstruction is present near the electronic device 10 where the obstruction may affect wireless communications with other devices in certain directions. For instance, if the sensing measurements are significantly different than the expected results (e.g., statistically low, such as different by more than twenty-five percent) for references channels having corresponding transmitters in a range of azimuths to the electronic device 10, then a determination may be made that an obstruction, not otherwise known in available terrain data, is likely present at those azimuth angles. In detecting an obstruction under this approach, it is advantageous to know the antenna pattern and orientation of the electronic device 10 so that the expected results are determined to account for differences in received power that arise from different antenna configurations and orientations.

Understanding the location of an obstruction relative to the electronic device 10 may be of value for channel selection, location selection, or antenna gain profile selection for the electronic device 10. Sometimes, an obstruction may be beneficial to the operation of the electronic device 10. For example, the electronic device 10 may be able to use an available channel if it is known that out-of-band emissions from a high-power transmitter 80 operating on an adjacent channel are likely to be blocked by the obstruction.

Another use is to compare the sensing results of two or more devices (e.g., the electronic devices 10 and 11) to determine if one of the devices has an impairment, determine if one of the devices is located in a poor location for wireless communications, to compare the suitability of the locations for wireless communications, etc.

Another use for normalized and calibrated sensing data from multiple devices 10, 11 is to collectively analyze the data to characterize the spectrum or RF environment in an area in which the devices are located. By collecting data from multiple devices and at multiple times of day over a period of time (e.g., days or weeks), changes in the spectrum environment according to time-of-day or other cycles may be predicted. For instance, the noise floor in a center city may tend to ebb and flow with work hours. The sensing data may be used to characterize the nature of these changes to facilitate better use of spectrum, such as assisting radio devices to collectively plan spectrum use over available channels to improve quality of service.

E. Prophetic Example

With additional reference to FIG. 4, illustrated is an exemplary table that shows representative results for sensing spectrum over TV channels 21 through 27 with the electronic device 10, normalizing the sensing data, predicting expected signal strengths for known transmitters in the sensed channel range, and calibrating the sensing data. In the example, there are transmitters on channels 21, 22, 23, 25, 26 and 27.

The transmitter column 200 assigns a number to each transmitter 80 having a protected area in which the electronic device 10 is located. Column 202 identifies the primary channel for the transmitters 80. Column 204 identifies the operating frequency of the primary channels and column 206 identifies the corresponding wavelength. Column 208 identifies the azimuth from the electronic device 10 to the transmitter 80. Column 210 identifies a relative gain adjustment value for each transmitter based on the antenna configuration and orientation of the electronic device 10. In this prophetic example, it is assumed that the electronic device 10 has an omnidirectional antenna. Therefore, the relative gain adjustment value for each transmitter is zero.

Column 212 contains the predicted field strength for each transmitter 80 in the location of the electronic device 10. Column 214 contains the sensing measurements made by the electronic device 10. The sensing measurements are normalized for bandwidth resolution and the normalized values are shown in column 216. Column 218 shows the predicted values of column 212 converted to energy per unit bandwidth. Column 220 shows the differences between the normalized sensing measurements (column 216) and the respective predicted receive power values (column 218). In the example, the differences of column 220 (or calibration offset values) are averaged to determined the calibration adjustment value. For the example, the calibration adjustment value is 4.7.

With additional reference to table 1, the sensing data for channel 24 is normalized, converted to an electric field strength value, and calibrated by adding the calibration adjustment value to the electric field strength value. In the foregoing approach, positive calibration adjustment values increase the normalized sensing measurement value and negative calibration adjustment values decrease the normalized sensing measurement value.

TABLE 1

| TV channel no. | Channel frequency (MHz) | Channel wavelength (m) | Actual sensing measurement (dbm/ 100 kHz) | Normalized sensing measurement (dbm/ 6 MHz) | Calibrated electric field strength (dbuV/m) |
|---|---|---|---|---|---|
| 24 | 533 | 0.562851782 | −80 | −62.2 | 73.7 |

F. Conclusion

Although certain embodiments have been shown and described, it is understood that equivalents and modifications falling within the scope of the appended claims will occur to others who are skilled in the art upon the reading and understanding of this specification.

What is claimed is:

1. A system for generating spectrum environment data, comprising:
a communications interface over which spectrum sensing data is received from an electronic device, the sensing data comprising a sensing measurement value indicative of sensed signal strength for each of plural channels, each sensing measurement value having a sensing resolution bandwidth; and
a processor that executes logical instructions to:
normalize the received sensing measurement values so that each value has a predetermined analysis resolution bandwidth; and
calibrate the normalized sensing measurement values to adjust for differences between sensed signal strength and predicted signal strength for at least one reference channel on which a protected transmitter with known operational characteristics transmits.

2. The system of claim 1, wherein the calibrated values are transmitted to the electronic device.

3. The system of claim 1, wherein to perform the calibration, the processor executes logical instructions to:
identify protected transmitters having a protected area in which the electronic device is located, each primary channel of the identified transmitters being a reference channel;
for each reference channel, determine a predicted signal strength value that ought to be detected by the electronic device;
for each reference channel, determine a difference between the normalized sensing measurement value and the predicted signal strength value, the difference being a calibration offset; and
adjust the normalized sensing measurement values with the calibration offset values.

4. The system of claim 3, wherein the predicted signal strength values are adjusted for characteristics of the electronic device.

5. The system of claim 4, wherein the characteristics of the electronic device include antenna gain profile and orientation.

6. The system of claim 3, wherein to adjust the normalized sensing measurement values with the calibration offset values, the processor executes logical instructions to generate a calibration adjustment value as a function of the calibration offset values and apply the calibration adjustment value to each of the normalized sensing measurement values.

7. The system of claim 6, wherein the calibration adjustment value is an average of the calibration offset values.

8. The system of claim 3, wherein to adjust the normalized sensing measurement values with the calibration offset values, the processor executes logical instructions to, for each normalized sensing measurement value, combine the calibration offset value that is closest in frequency to the channel of the normalized sensing measurement value with the normalized sensing measurement value.

9. The system of claim 1, wherein the channels for which sensing measurement values are received are television channels and the transmitters are television station transmitters.

10. The system of claim 1, wherein the reference channels correspond to one of television station transmitters, radio station transmitters, transmitters or beacons having known and stable transmission characteristics, or combinations thereof.

11. The system of claim 1, wherein the processor further executes logical instructions to identify an obstruction that affects the receive performance of the electronic device and an azimuth from the electronic device to the obstruction.

12. The system of claim 11, wherein a possible obstruction is identified if the sensing measurement values in a range of azimuths from the electronic device are lower than corresponding predicted values by a predetermined amount.

13. The system of claim 1, wherein the system normalizes and calibrates sensing measurement values for a plurality of electronic devices.

14. The system of claim 13, wherein the processor further executes logical instructions to collectively assess the calibrated values to establish a spectrum environment profile.

15. The system of claim 14, wherein the processor further executes logical instructions to predict changes to the spectrum environment profile over time.

16. The system of claim 13, wherein the processor further executes logical instructions to determine that one of the electronic devices has a wireless communications impairment.

17. The system of claim 1, wherein the processor further executes logical instructions to share the calibrated values with an electronic device other than the electronic device from which the sensing measurement values are received.

18. A method for generating spectrum environment data, comprising:
   receiving spectrum sensing data from an electronic device with a server, the sensing data comprising a sensing measurement value indicative of sensed signal strength for each of plural channels, each sensing measurement value having a sensing resolution bandwidth;
   normalizing, with the server, the received sensing measurement values so that each value has a predetermined analysis resolution bandwidth; and
   calibrating, with the server, the normalized sensing measurement values to adjust for differences between sensed signal strength and predicted signal strength for at least one reference channel on which a protected transmitter with known operational characteristics transmits.

19. The method of claim 18, further comprising transmitting the calibrated values to the electronic device.

20. The method of claim 18, wherein the calibrating includes:
   identifying protected transmitters having a protected area in which the electronic device is located, each primary channel of the identified transmitters being a reference channel;
   for each reference channel, determining a predicted signal strength value that ought to be detected by the electronic device;
   for each reference channel, determining a difference between the normalized sensing measurement value and the predicted signal strength value, the difference being a calibration offset; and
   adjusting the normalized sensing measurement values with the calibration offset values.

21. The method of claim 20, further comprising adjusting the predicted signal strength values for characteristics of the electronic device.

22. The method of claim 21, wherein the characteristics of the electronic device include antenna gain profile and orientation.

23. The method of claim 20, wherein the adjusting the normalized sensing measurement values with the calibration offset values includes generating a calibration adjustment value as a function of the calibration offset values and applying the calibration adjustment value to each of the normalized sensing measurement values.

24. The method of claim 23, wherein the calibration adjustment value is an average of the calibration offset values.

25. The method of claim 20, wherein adjusting the normalized sensing measurement values with the calibration offset values includes, for each normalized sensing measurement value, combining the calibration offset value that is closest in frequency to the channel of the normalized sensing measurement value with the normalized sensing measurement value.

26. The method of claim 18, wherein the channels for which sensing measurement values are received are television channels and the transmitters are television station transmitters.

27. The method of claim 18, wherein the reference channels correspond to one of television station transmitters, radio station transmitters, transmitters or beacons having known and stable transmission characteristics, or combinations thereof.

28. The method of claim 18, further comprising identifying an obstruction that affects the receive performance of the electronic device and an azimuth from the electronic device to the obstruction.

29. The method of claim 28, wherein an obstruction is identified if the sensing measurement values in a range of azimuths from the electronic device are lower than corresponding predicted values by a predetermined amount.

30. The method of claim 18, wherein the method is carried out to normalize and calibrate sensing measurement values for a plurality of electronic devices.

31. The method of claim 30, further comprising collectively assessing the calibrated values to establish a spectrum environment profile.

32. The method of claim 31, further comprising predicting changes to the spectrum environment profile over time.

33. The method of claim 30, further comprising determining that one of the electronic devices has a wireless communications impairment.

34. The method of claim 18, further comprising sharing the calibrated values with an electronic device other than the electronic device from which the sensing measurement values are received.

* * * * *